US009795076B2

(12) United States Patent
Lind et al.

(10) Patent No.: US 9,795,076 B2
(45) Date of Patent: Oct. 24, 2017

(54) QUICK CONNECT PNEUMATIC COUPLER (71) Applicant: Kinze Manufacturing, Inc., Williamsburg, IA (US)

(72) Inventors: Riley Lind, North Liberty, IA (US); Matthew J. Wilhelmi, Parnell, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 222 days.

(21) Appl. No.: 14/534,711

(22) Filed: Nov. 6, 2014

(65) Prior Publication Data
US 2016/0131294 A1    May 12, 2016

(51) Int. Cl.
*F16L 41/14*    (2006.01)
*A01C 7/08*    (2006.01)

(52) U.S. Cl.
CPC .............. *A01C 7/082* (2013.01); *F16L 41/14* (2013.01)

(58) Field of Classification Search
CPC .............. F16L 5/06; F16L 41/08; F16L 41/14
See application file for complete search history.

(56) References Cited

U.S. PATENT DOCUMENTS

| 1,131,399 | A | * | 3/1915 | McGinley | H02G 3/081 174/62 |
| 2,630,339 | A | * | 3/1953 | Appleton | F16L 19/10 285/154.1 |
| 3,181,899 | A | * | 5/1965 | McKnight, Jr. | F16L 41/14 285/139.2 |
| 3,661,356 | A | * | 5/1972 | Tucker | F16K 1/16 137/360 |
| 4,133,560 | A | * | 1/1979 | Ishikawa | F16L 41/084 220/293 |
| 4,280,527 | A | * | 7/1981 | Pease | A47L 15/4217 137/343 |
| 4,449,737 | A | * | 5/1984 | Specht | F16L 37/008 285/192 |
| 5,542,761 | A | * | 8/1996 | Dedoes | B01F 7/1695 366/198 |
| 5,622,392 | A | * | 4/1997 | Gochenouer | F16L 3/22 285/124.1 |
| 5,704,656 | A | * | 1/1998 | Rowe | F16L 5/02 285/139.3 |
| 6,725,788 | B2 | | 4/2004 | McCartney et al. | |

(Continued)

OTHER PUBLICATIONS

United States Patent & Trademark Office, "PCT International Search Report and Written Opinion", Issued in Connection to PCT/US2015/054684, dated Dec. 30, 2015, 8 pages.

*Primary Examiner* — Daniel Wiley
(74) *Attorney, Agent, or Firm* — McKee, Voorhees & Sease, PLC (57) ABSTRACT

A pneumatic coupler and method for coupling a hose to a surface of an agricultural implement is provided. The pneumatic coupler includes a hollow tube with a radially extending flange. The flange has one or more cutouts to permit the flange to pass through an aperture containing one or more protrusions. The flange has one or more recesses to mate with the one or more protrusions to mitigate rotation of the pneumatic coupler relative to the surface. A nut connects to the hollow tube and at least partially surrounds the hollow tube. A sealing member disposed between the flange and the nut provides a seal at the aperture of the surface.

9 Claims, 11 Drawing Sheets (56) References Cited

U.S. PATENT DOCUMENTS

| | | | |
|---|---|---|---|
| 7,121,589 B2* | 10/2006 | Hawkinson | E03B 3/03 285/139.2 |
| 7,966,848 B2* | 6/2011 | Jang | D06F 39/083 68/18 F |
| 2001/0002494 A1 | 6/2001 | Fritz et al. | |
| 2004/0140667 A1 | 7/2004 | Breay et al. | |
| 2005/0035594 A1 | 2/2005 | Kiely | |
| 2011/0031740 A1 | 2/2011 | Stone | |

* cited by examiner

QUICK CONNECT PNEUMATIC COUPLER

FIELD OF THE INVENTION

The present invention relates generally to components used in agricultural planting implements for dispensing seeds. More particularly, but not exclusively, the invention relates to the installation of pneumatic hoses to toolbars of agricultural planting implements in pneumatic seed meter systems.

BACKGROUND OF THE INVENTION

A seed meter is a mechanism installed on agricultural planting implement to accurately and precisely distribute seed into the ground. The seed meter may be designed to deposit a singular seed at predetermined intervals along a seed trench. In such instances, the seed meter is designed to limit, and preferably eliminate, depositing more than one seed at a given interval (i.e., "multiples") and failing to deposit a seed (i.e., "skips") to promote a uniform emergence of plants.

Several types of seed meters systems exist, including but not limited to, brush-type, mechanical finger, and pneumatic. Pneumatic seed meters utilize positive air pressure or negative air pressure (i.e., a vacuum) generated by an air pump. The change in air pressure may be transmitted to the components of the pneumatic seed meter system through hoses. The pneumatic hoses may be mounted to the components via pneumatic couplers. The pneumatic couplers may be installed on a toolbar or other surfaces of the agricultural planting implement.

The installation of a pneumatic coupler is typically performed by welding hollow tubes, called bungs, onto a planter tube wall of the toolbar. The wall may be made of sheet metal. The process is cumbersome and may alter the material properties of the welded area of the bung and/or wall, possibly compromising the integrity of the same. Likewise, if a bung needs to be replaced, the welded bung must be chiseled, grinded or torched, processes that are also inefficient and may compromise and/or permanently damage the wall and/or toolbar. Moreover, other modes of installation of a pneumatic coupler often require the user have physical access to the inside surface of the wall. Given the space constrains of toolbars and agricultural machine implements generally, gaining access and clearance to effectively work on the inside surface of the wall may be unachievable.

Therefore, there is a need in the art for an improved method and pneumatic coupler that permits the coupler to be installed or changed without user access to the interior of the toolbar. Further, a need exists to install or change the pneumatic coupler by means that do not significantly affect the integrity of the bung or planter tube wall.

The toolbar and/or planter tube wall may be of different thicknesses depending on the size, structure and application of the agricultural planting implement. Pneumatic couplers utilizing a two-piece construction, whereby male and female portions are mated through an aperture on opposite sides of the planter tube wall, do not accommodate toolbars and planter tube walls of significantly different thicknesses. As a result, an individual seeking to install or change a pneumatic coupler may need to maintain an inventory of different sized couplers with associated inconvenience and expense.

Therefore, there is a need in the art for an improved pneumatic coupler that accommodates toolbars and planter tube walls of different thicknesses. There is also a need in the art for an improved method for installing and changing a pneumatic coupler on toolbars and planter tube walls of different thicknesses.

SUMMARY OF THE INVENTION

It is therefore a primary object, feature, and/or advantage of the present invention to improve on or overcome the deficiencies in the art.

It is another object, feature, and/or advantage of the present invention to permit installation of a pneumatic coupler without access to the interior of the toolbar or otherwise backside of a surface.

It is another object, feature, and/or advantage of the present invention to provide a pneumatic coupler that does not require invasive installation methods to preserve the integrity of the bung, planter tube wall and/or toolbar.

It is yet another object, feature, and/or advantage of the present invention to provide a pneumatic coupler to accommodate toolbars and/or planter tube walls of different thicknesses.

It is still another object, feature, and/or advantage of the present invention to provide an improved method of connecting a pneumatic coupler to a toolbar of an agricultural implement.

It is a further object, feature, and/or advantage of the present invention to provide a sealing member positioned between a bung nut and the exterior of the planter tube wall to provide a seal.

It is still a further object, feature, and/or advantage of the present invention to provide a crush rib to provide the appropriate amount of compression to the sealing member.

It is yet a further object, feature, and/or advantage of the present invention to provide at least one cutout in a flange of the bung to permit the flange to pass through an aperture of the planter tube wall, and at least one recess in the flange of the bung to mitigate rotation of the bung relative to the planter tube wall.

These and/or other objects, features, and advantages of the present invention will be apparent to those skilled in the art. The present invention is not to be limited to or by these objects, features and advantages. No single embodiment need provide each and every object, feature, or advantage.

According to an aspect of the invention, a hollow tube is provided. The hollow tube includes a flange configured to pass through an aperture in a wall of an implement. The flange includes a surface for mating with at least a portion of a first side of the wall. A nut at least partially surrounds the hollow tube and is connected to the hollow tube on a second side of the wall. A sealing member is positioned between the nut and the second side of the wall to provide a seal at the aperture of the wall.

According to another aspect of the invention, a method for coupling a pneumatic coupler to a toolbar of an agricultural implement is provided. A flange of a hollow tube is passed through an aperture in a wall of the toolbar and mated with a first side of the wall. A nut and sealing member are positioned external to the hollow tube. The nut and sealing member are connected to the hollow tube on a second side of the wall of the toolbar such that the sealing member provides a seal at the aperture of the toolbar.

According to yet another aspect of the invention, a hollow tube is provided. A flange extends radially from the hollow tube and has a thickness defined between a first wall and a second wall. At least one cutout within the flange has a depth equal to the thickness of the flange and is shaped to permit the flange to pass through an aperture having at least one protrusion. To mitigate rotation of the pneumatic coupler relative to the toolbar, at least one recess within the first wall of the flange has a depth less than the thickness of the flange and is shaped to mate with the at least one protrusion of the aperture of the toolbar. A nut connects to the hollow tube and at least partially surrounds the hollow tube.

DETAILED DESCRIPTION OF THE PREFERRED EMBODIMENTS

Figure 1:
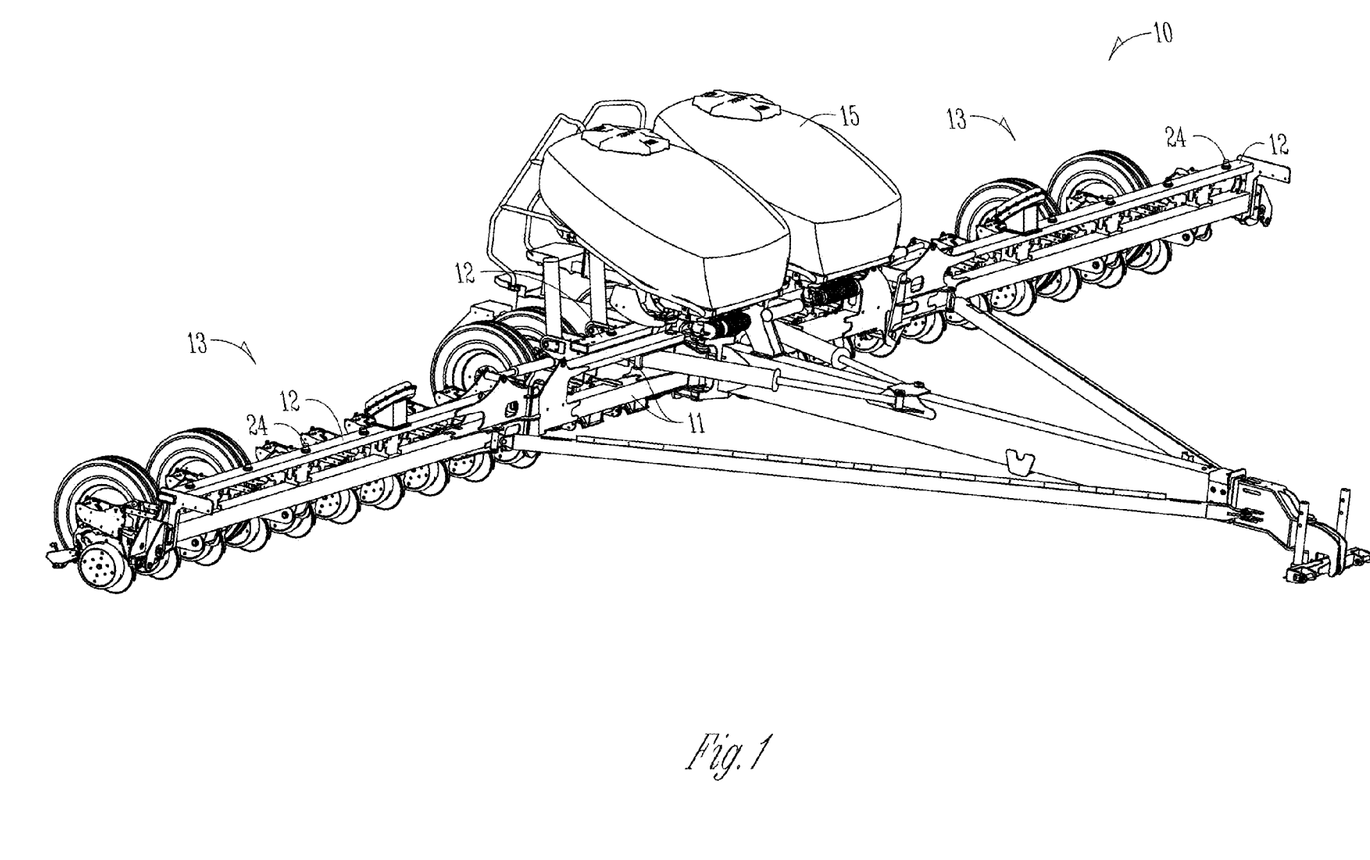
FIG. 1 is a perspective view of a conventional planter row unit in a planting position.

FIG. 1 shows a conventional planter implement 10. While the figure shows a planter, it should be appreciated by those skilled in the art that the invention covers other types of implements, including but not limited to, nutrient applicators, plows, discs, air seeders, and other agricultural equipment. The implement 10 may include a central frame 11, to which numerous components of the implement 10 may be connected, including but not limited to, left and right wings 13, hoppers 15, pumps, seed meters, and toolbars 12. The wings 13 may also have toolbars 12. Pneumatic couplers 24 of the present invention may be connected to the toolbars 12. However, the present invention contemplates that the pneumatic couplers may be connected to any substantially planar structure requiring interfacing with pneumatic hoses (not shown).

For example, the wings and central tool bar may include row units attached thereto. The row units can include ground-engaging and/or particulate supplying devices, such as seed meters at the row units for planting seed in a field. The seed meters, which may be air seed meters, will be operatively attached to pressure sources (either positive or negative) via pneumatic air hoses. Therefore, aspects of the invention provide for installing vacuum or other pneumatic hoses to the planter, such as at tube frames. As will be understood, this can be accomplished without need of access to the interior or backside of the tube frames, toolbars, or other surfaces to which the pneumatic hoses will be attached.

Figure 2:
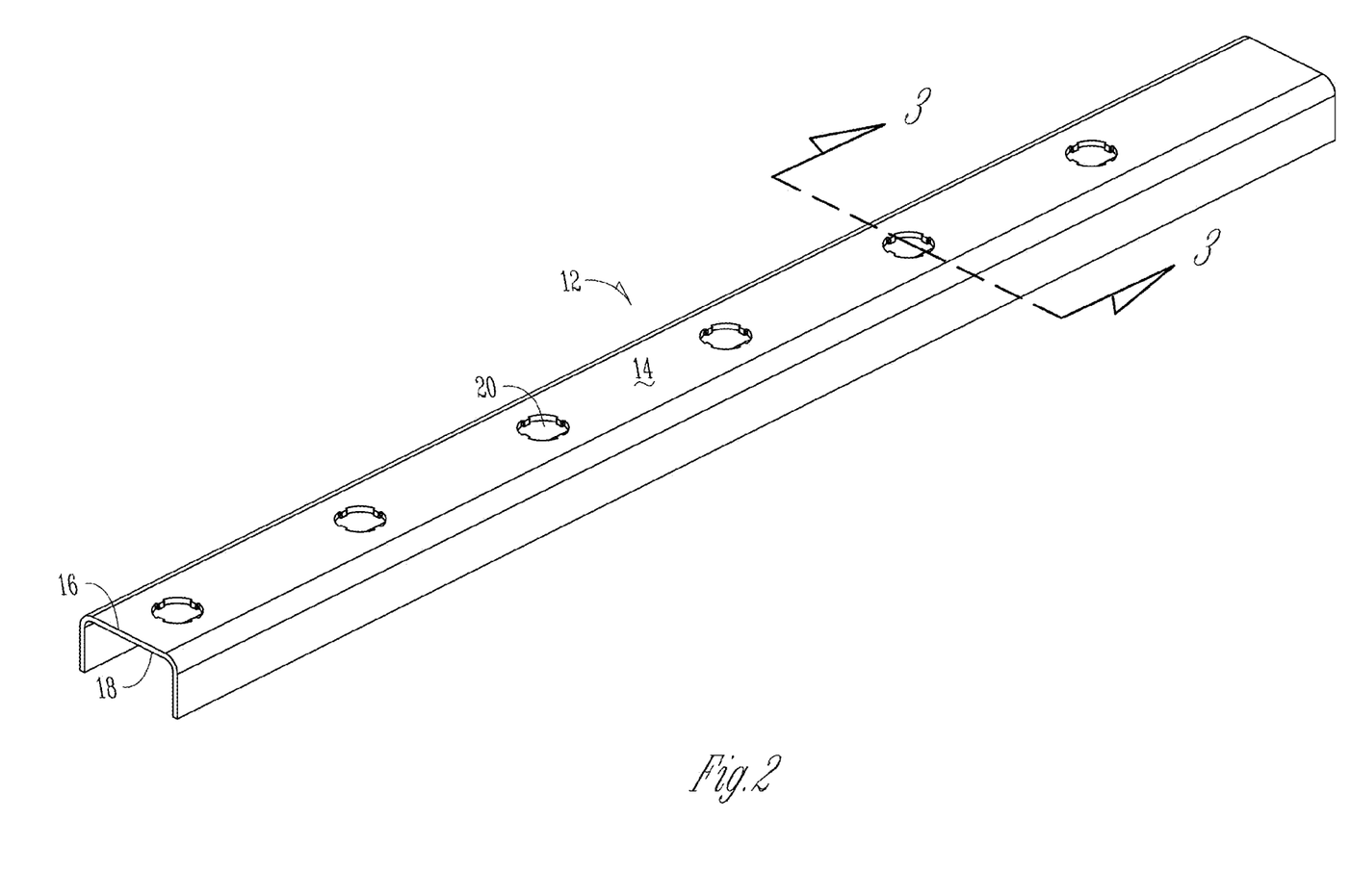
FIG. 2 is a partial perspective view of a toolbar of FIG. 1.
Figure 3:
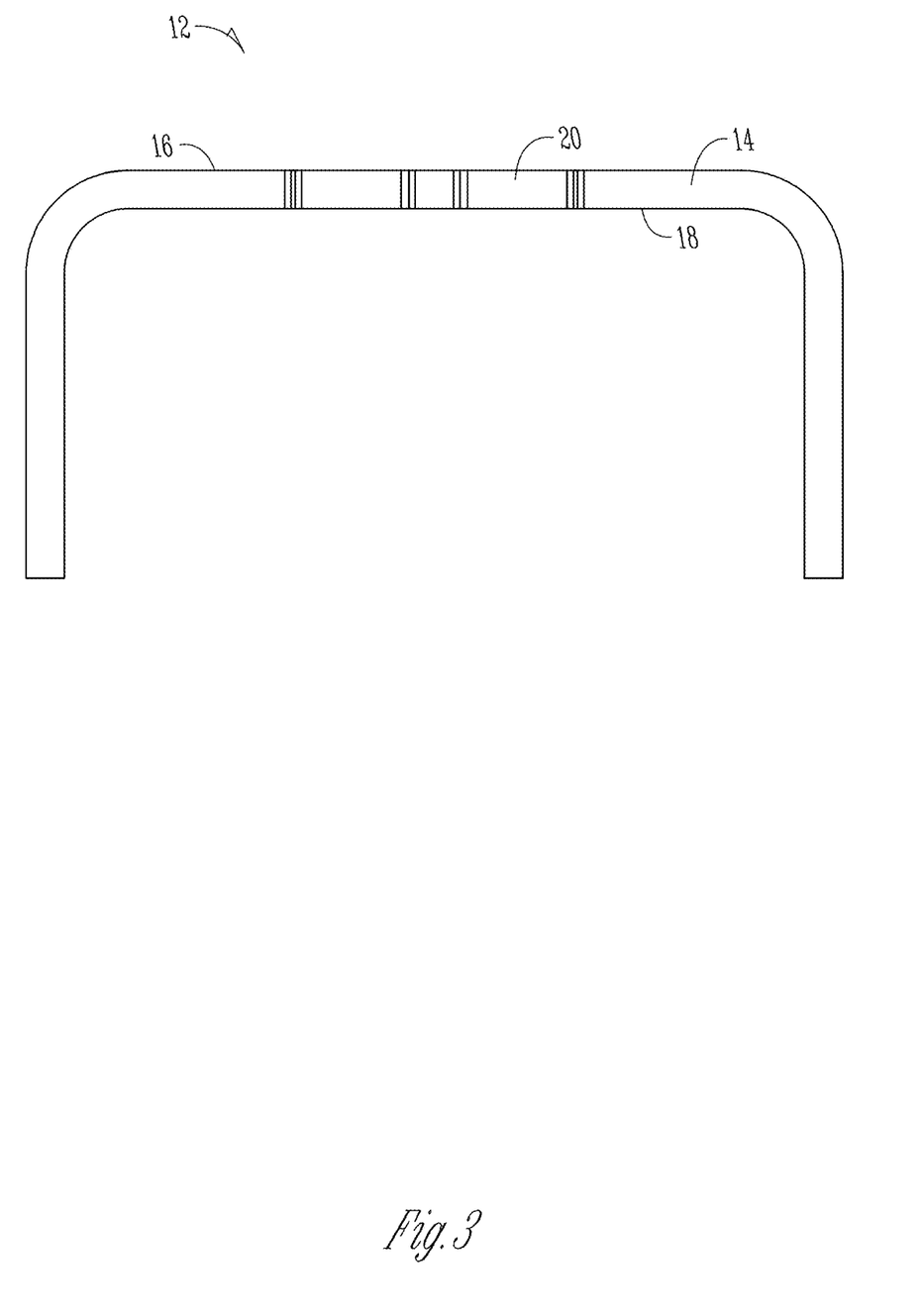
FIG. 3 is a cross-sectional side view of the toolbar of FIG. 2.

Referring to FIGS. 2 and 3, the toolbar 12 may have a substantially planar tube wall 14. The wall 14 may be constructed of sheet metal, but the toolbar 12 and/or the wall 14 may be constructed from any suitable material known to one skilled in the art. The wall 14 may have one or more apertures 20 through which pneumatic couplers 24 may be connected. The apertures 20 can be sized and dimensioned in generally any matter, and could be dependent on the particular function of the coupler being attached thereto. The wall 14 may have a first side 18 and a second side 16, but also may be dimensioned in a variety of shapes and sizes.

Figure 4:
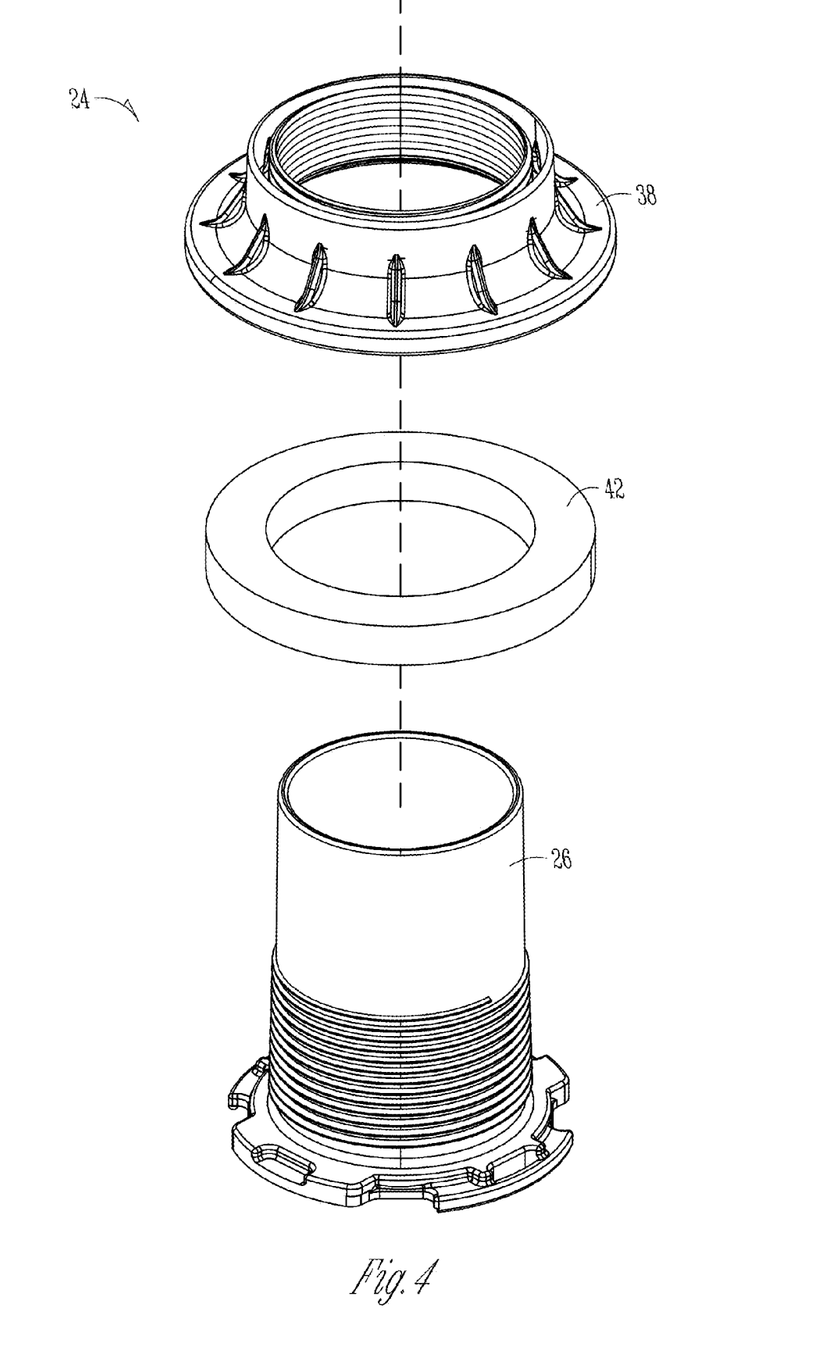
FIG. 4 is an exploded front perspective view of an embodiment of a pneumatic coupler according to at least some aspects of the invention.
Figure 5:
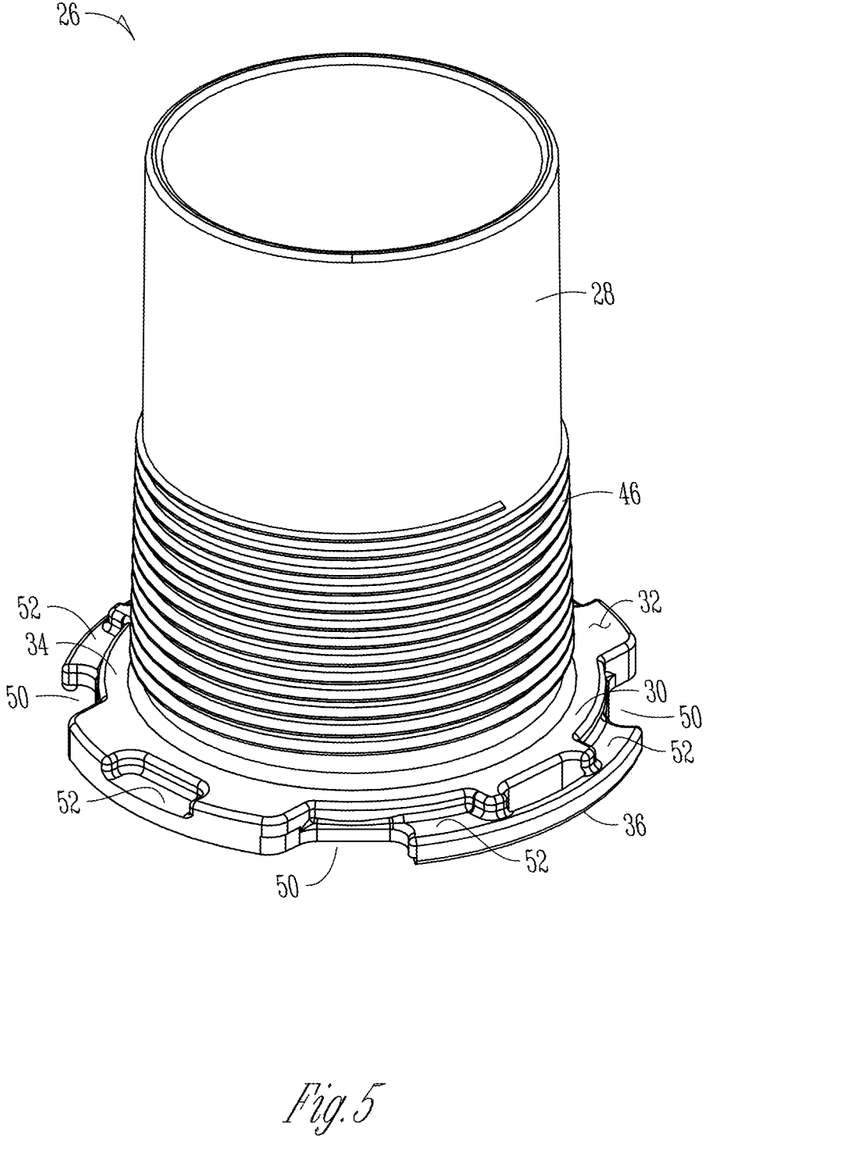
FIG. 5 is a front perspective view of an embodiment of the bung according to aspects of the invention.

FIG. 4 shows a pneumatic coupler 24 according to aspects of the invention and for use with coupling to a surface of a planter or other implement, such as a toolbar or tube frame for attaching a pneumatic hose thereto. The coupler 24 comprises a bung 28, a sealing member 42, and a bung nut 38. The bung 28 may be manufactured with materials such as brass, steel, polymers or plastics, but may be made with any material of suitable material properties known to one skilled in the art. The bung 28, as shown in FIG. 5, includes a substantially hollow tube 28. At least a portion of the hollow tube is configured for connecting to a pneumatic hose, such as be clamping or otherwise attaching the hose to a portion of the tube in a substantially fluid tight manner. The hollow tube 28 may have external threads 46, but other means of providing a connection to the bung nut 38 are envisioned, as will be understood. As shown in the figures, the hollow tube 28 has a flange structure 30 at a one end of the hollow tube 28. The invention contemplates that the flange 30 may be located along any circumference of the hollow tube 28, provided the corresponding structures are adjusted to accommodate the function and purposes of the present invention. For example, the flange 30 may encircle the hollow tube 28 at or about a midpoint along the length of the hollow tube 28. The threads 46, or other means for connection, would be moved to a position such that a bung nut 38 may secure the bung 26 to the wall 14. In such an instance, each of the two ends of hollow tube 28 of bung 26 would be connectable to pneumatic tubes.

The flange 30 of the bung 26 may have a surface 32 generally associated with a first side 34 and a second opposite side 36. The flange 30 also may have one or more cutouts 50, comprising removed material along the perimeter of the flange 30 that extends from the first wall 34 to the bottom wall 36. In the shown embodiment of FIGS. 5 and 10, the cross sections of cutouts 50 are shaped similar to rectangles with corner radii, also known as roundtangles. The cutouts 50 may be of any size and/or shape, provided the protrusions 22 of the wall 14 are correspondingly sized and shaped, as discussed in greater detail below. Within the surface 32 of the flange 30 are also one or more recesses 52, comprising removed material along the perimeter of the flange 30 that extends from the first side 34, but does not extend through the flange to the second side 36. The recesses 52 may be of similar size and/or shape to the cutouts 50, as shown in FIG. 5, or of different sizes and/or shapes. The recesses 52 may be of any size and/or shape, provided the protrusions 22 of the wall 14 are correspondingly sized and shaped, as also discussed in greater detail below.

Figure 6:
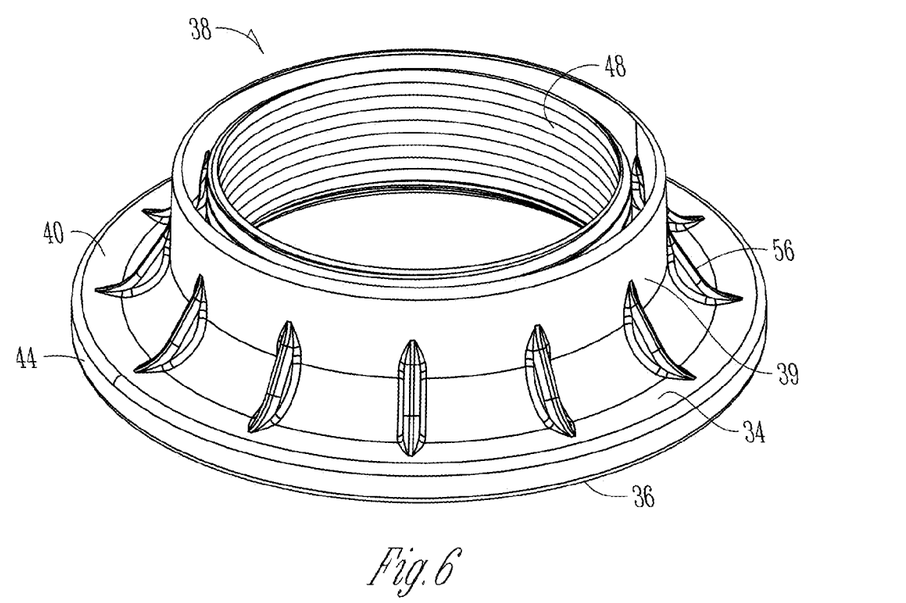
FIG. 6 is a front perspective view of an embodiment of the bung nut according to the invention.
Figure 7:
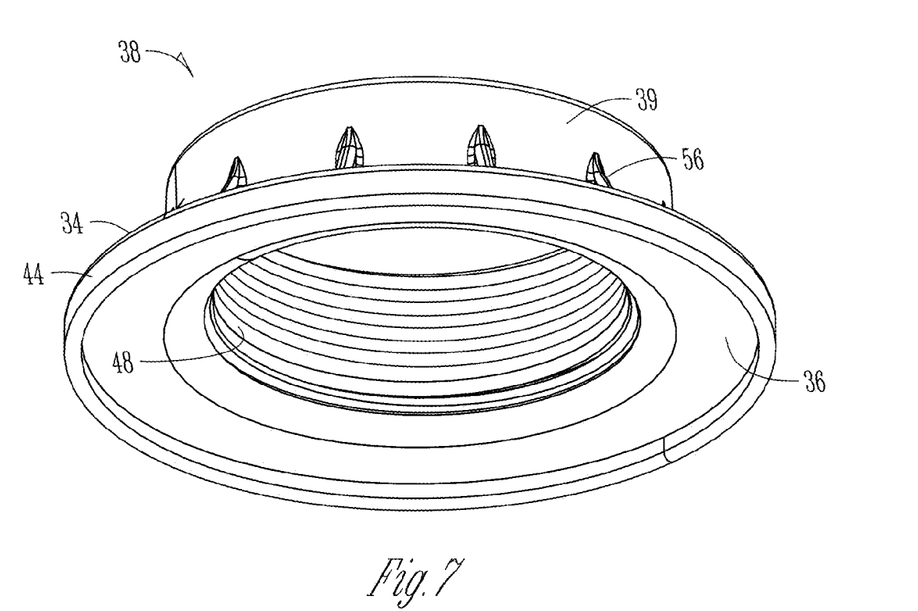
FIG. 7 is a rear perspective view of an embodiment of the bung nut according to the invention.
Figure 8:
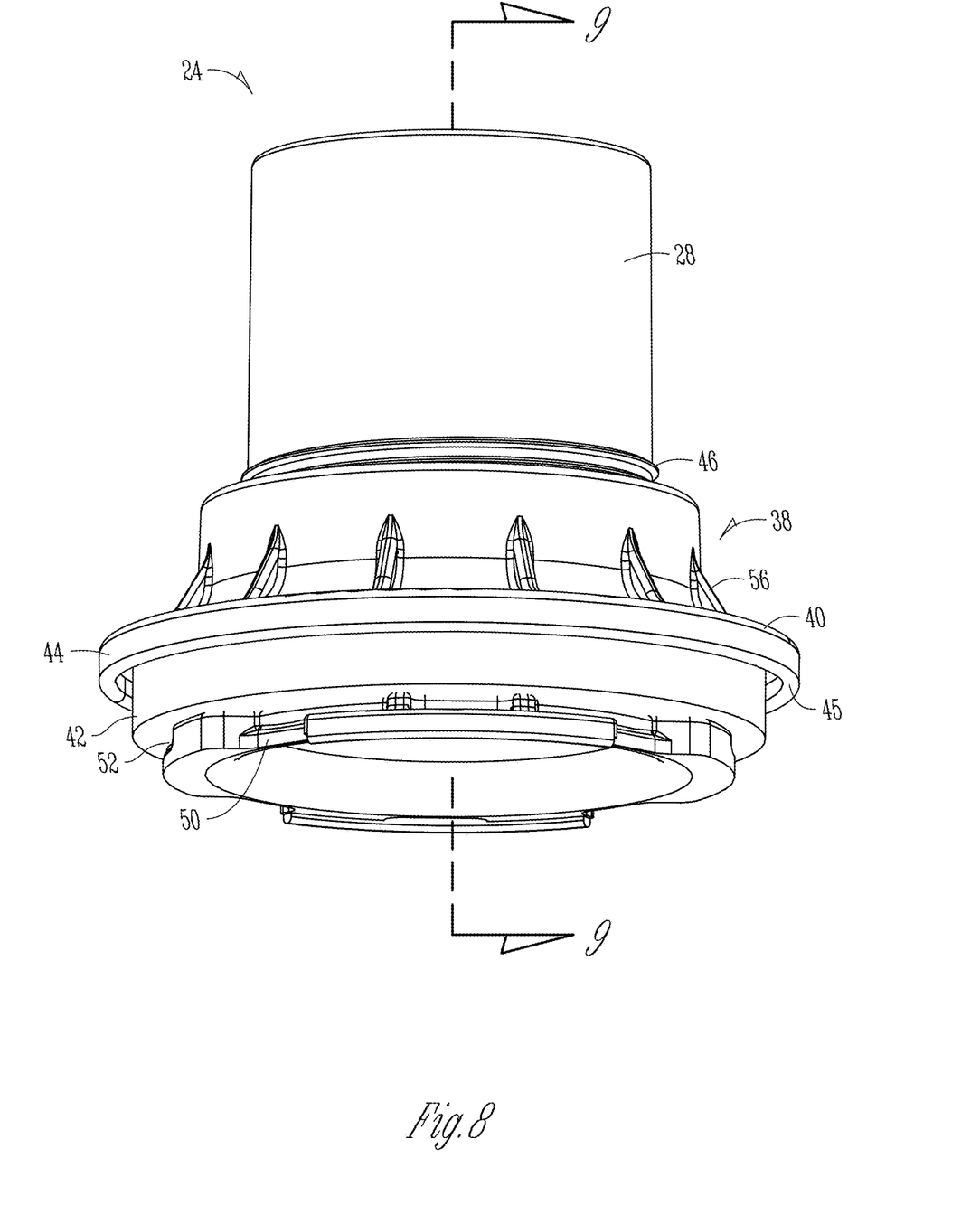
FIG. 8 is a perspective view of an assembled embodiment of the pneumatic coupler according to the invention.
Figure 9:
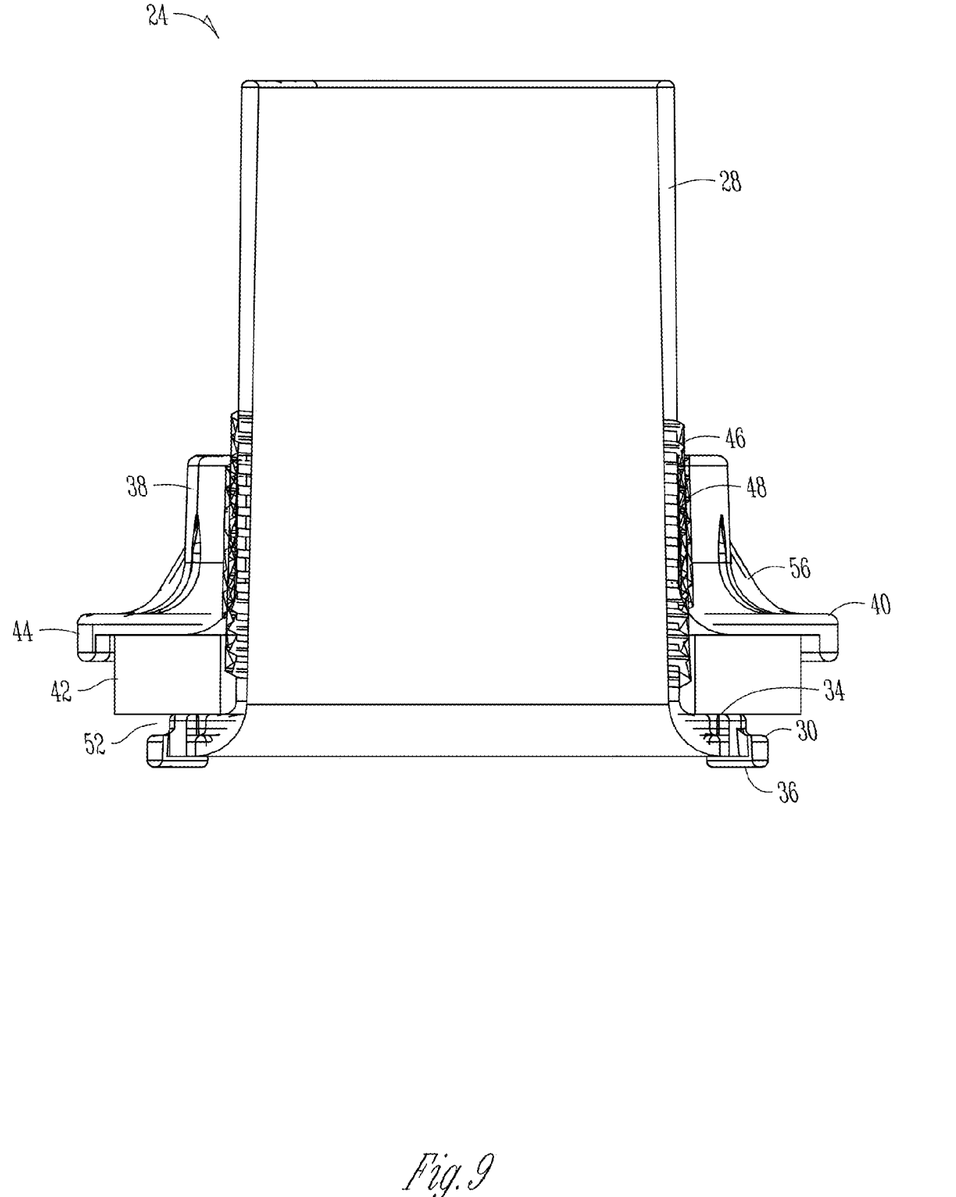
FIG. 9 is a cross-sectional view of an embodiment of FIG. 8.

Referring to FIGS. 6 and 7, the bung nut 38 may comprise a cylinder 39 with an inner diameter sized substantially to mate with the out diameter of the hollow tube 28 of bung 26. The nut 38 may be manufactured with materials such as brass, steel, polymers or plastics, but may be made with any material of suitable physical properties known to one skilled in the art. The nut 38 may have internal threads 48, but other means of providing a connection to the bung 26 are envisioned and discussed below. The nut 38 may also include a flange 40 at one end of the cylinder 39. The flange 40 may have a thickness generally defined between first wall 34 and a second wall 36. The interface between the cylinder 39 and the flange 40 may be reinforced with a plurality of ribs 56. Other means for structural support are envisioned, including a cylindrical ring with wedged-shaped cross section, a plurality of beam members, or other connectable reinforcements commonly known to one having ordinary skill in the art. The flange 40 may contain crush rib 44, which can comprise a structure extending inferiorly in a direction substantially perpendicular to the second wall 36. For example, the crush rib 44 can comprise a wall extending axially away from the flange around an outer periphery of the flange, and in the opposite direction of the cylinder 39. The length of the rib can be configured to interact with a sealing member and to provide a sealing distance for providing a substantially fluid-tight seal at the aperture in the toolbar or other structure. The second wall 36 of the flange 40 interior to the crush rib 44 may create a contact surface for the sealing member 42.

The sealing member 42 may comprise an elastomeric material, but may be composed of any compliant material capable of maintaining a substantially fluid-tight connection known to one skilled in the art. Examples include but are not limited to, sponge, ethylene propylene diene monomer (EDPM) rubber, nitrile rubber, silicone, metal, fiberglass, polytetrafluoroethylene (PTFE), or plastic polymers. The exact composition of the sealing member 42 is not to be limiting to the invention.

Referring to the figures, the components of the pneumatic coupler 24 may be assembled by joining the internal threads 48 of the nut 38 with the external threads 46 of the hollow tube 28. According to some aspects, the sealing member 42 may be disposed between the bung 36 and nut 38 adjacent to the second wall 36 of the flange 40 and interior to the crush rib 44. In some examples, the sealing member may be adhered to the flange of the nut 38. As a torque is applied to the nut 38, the sealing member 42 may be compressed between the second wall 36 of the flange 40 and second side 16 of the wall 14. The nut 38 is torqued until a surface 45 of the crush rib 44 contacts the second side 16 of the wall 14 of the toolbar 12. The crush rib 44 is designed to ensure the appropriate amount of compression of the sealing member 42, without over-compressing and without regard to the thickness of the wall of the toolbar 12. In addition to threading, the nut 38 may be secured to the bung 26 by any other appropriate means known to one having skilled in the art, including but not limited to, clamping, detent pins, bracing, latching, interference fit, and the like.

Figure 10:
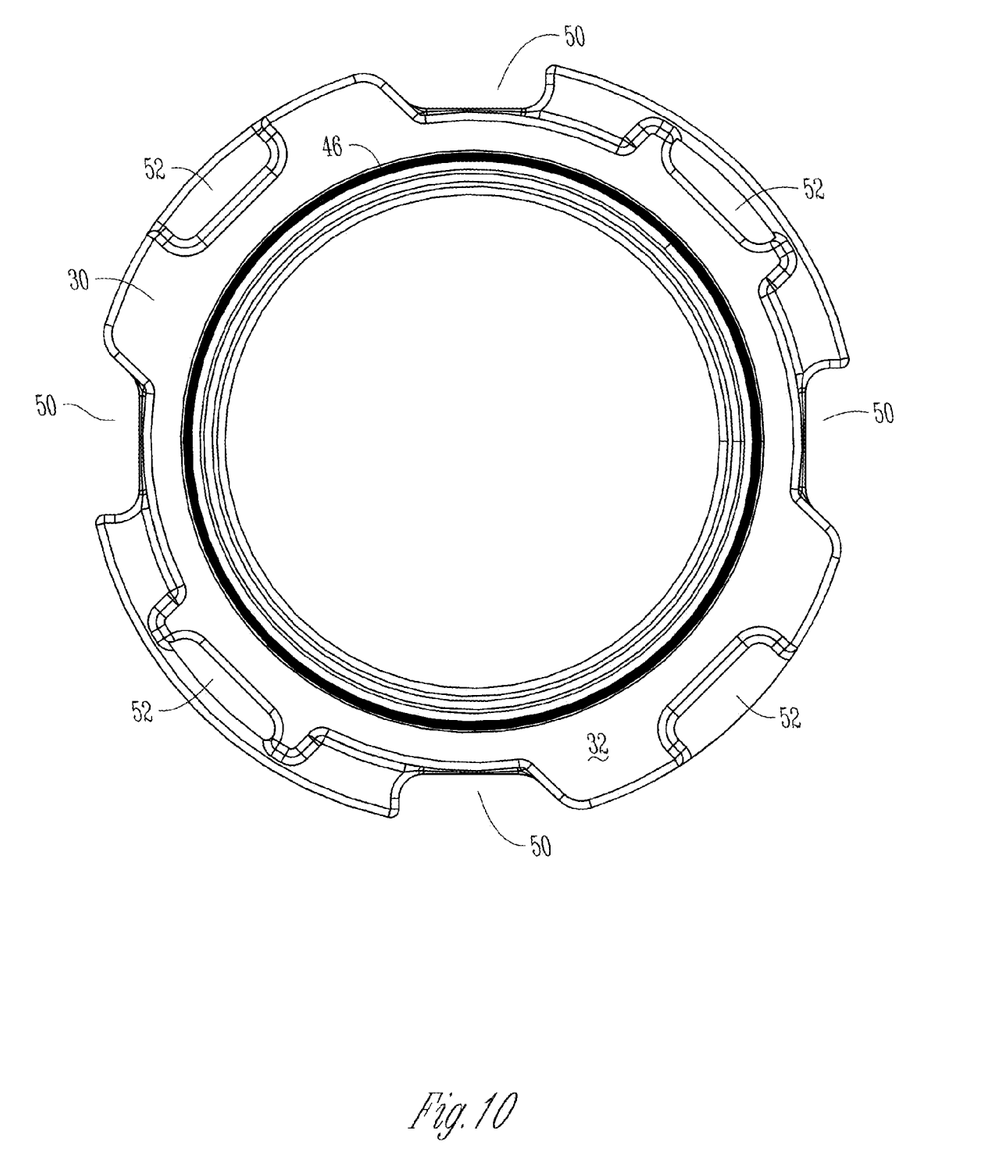
FIG. 10 is a top plan view of an embodiment of the bung of FIG. 5.
Figure 11:
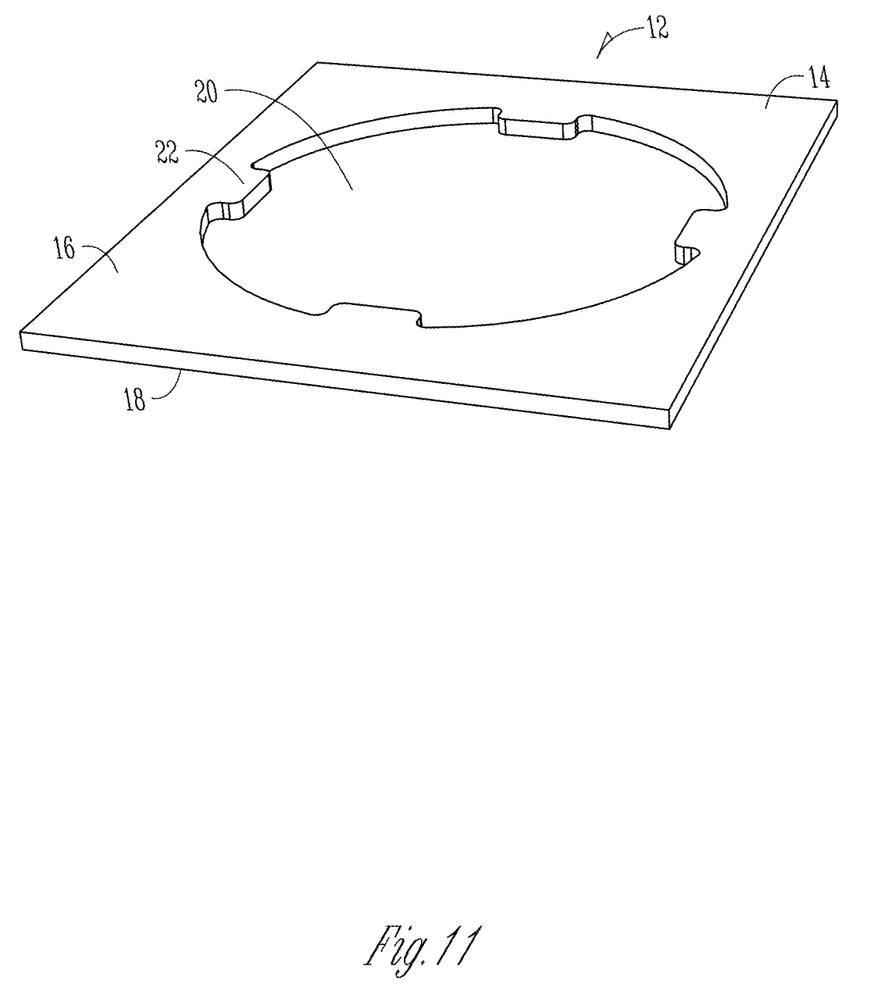
FIG. 11 is a partial perspective view of a portion of a toolbar, such as one used with an implement as shown in FIG. 1
Figure 12:
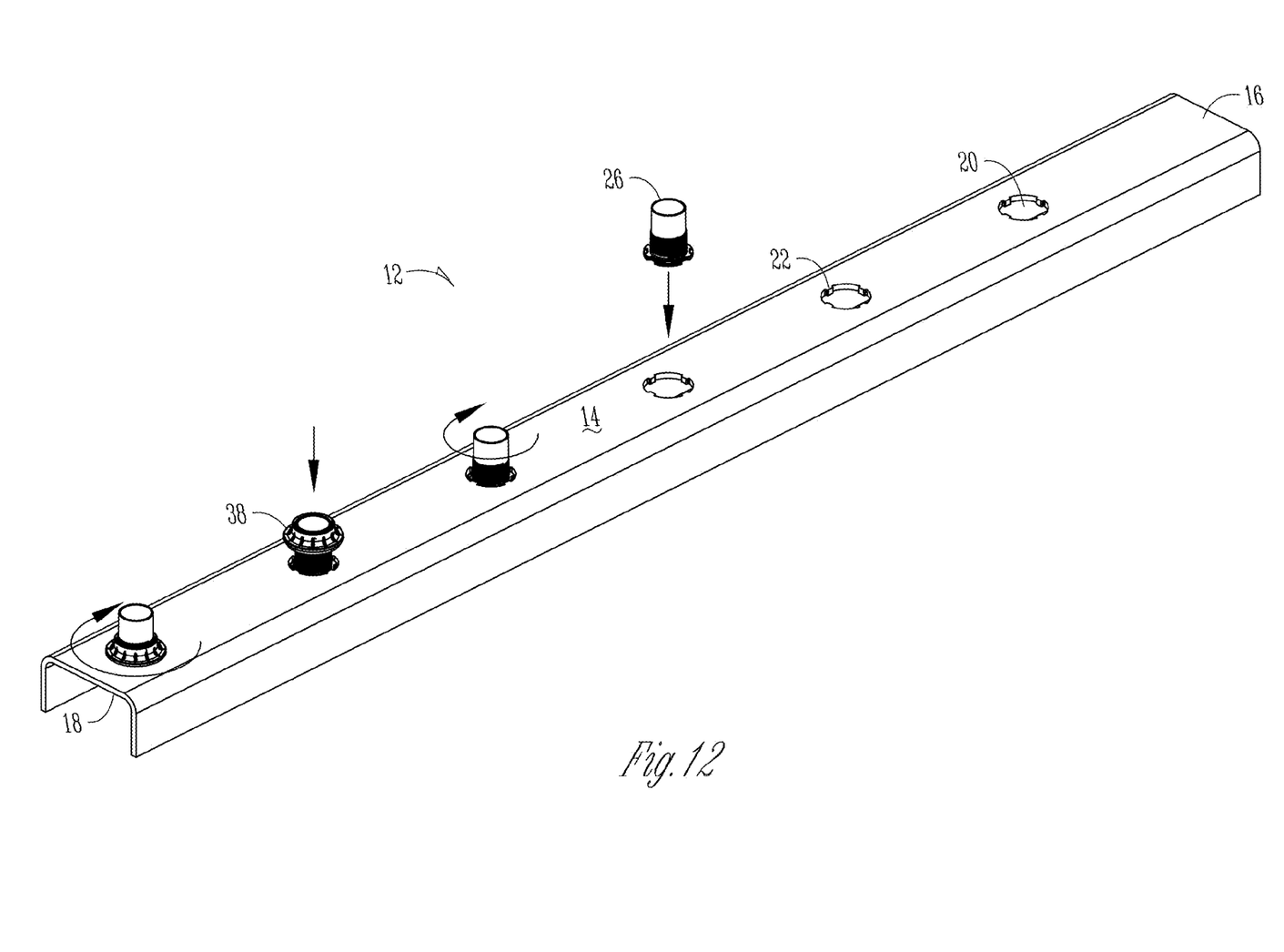
FIG. 12 is a partial perspective view of a toolbar showing assembly of a pneumatic coupler according to aspects of the invention.

Referring to FIGS. 10-12, one may secure the pneumatic coupler 24 to the toolbar 12 without access to the first side 18 of wall 14. The flange 30 of the bung 26 may be passed through the aperture 20 of the wall 14 of the toolbar 12. The wall 14 may have one or more protrusions 22 extending inwardly from the circumference of the aperture 20. The flange 30 of the bung 26 may have one or more cutouts 50 shaped to permit the flange 30, whose outer diameter is approximately equal to the diameter of the aperture 20, to pass through the aperture 20. Thereafter, the bung 26 may be rotated to align one or more recesses 52 with the one or more protrusions 22. The one or more recesses 52 also may be contoured to engage the protrusions 22. Upon aligning the one or more recesses 52 with the corresponding one or more protrusions 22 of the aperture 20, the individual moves the bung 26 upwardly, or in a direction consistent with removing the bung 26 from the aperture 20. The one or more recesses 52, which do not extend through the entire thickness of flange 30, mate to the one or more protrusions 22. The engagement of the one or more recesses 52 with the one or more protrusions 22 prevents rotation of the bung 26 relative to the wall 14 of the toolbar 12. The thickness of the one or more recesses 52 of the flange 30 may be approximately equal to the thickness of one or more protrusions 22 of the wall 14. Consequently, the surface 32 of the flange 30 may be substantially planar with the second side 16 of the wall 14. It is noted that the recesses and/or cutouts of the bung need not be identical in shape and/or size to the protrusions of the aperture, and instead, can comprise such a size and/or shape to allow the flange of the bung to pass therethrough and then, upon at least some rotation of the bung, provide a seating arrangement between the cutouts and the protrusions. However, it should also be appreciated that recesses need not be required, and the flange may instead seat directly against the protrusions of the toolbar.

Thereafter, the sealing member 42 may be placed around the hollow tube 28 from the second side 16 of the wall 14. Then, the nut 38 is lowered from the second side 16 of the wall 14, after which it is secured to the bung 26. In the preferred embodiment, the nut 38 is threadably engaged until the crush rib 44 contacts the second side 16 of the wall 14, thereby providing the appropriate amount of compression to the sealing member 42. A hose (not pictured) may then be secured to the installed pneumatic coupler 24.

The assembly of the pneumatic coupler as shown and described provides numerous advantages. For example, the components allow the coupler, and thus the pneumatic hose, to be connected when only having access to one side of the connecting surface. Additionally, the crush rib and configuration of the components allows for the assembly to be used to connect to a surface of any thickness, i.e., it is independent of the material thickness. The crush rib provides both the clamping force and maintains a set distance from the connecting surface such that the seal is not over- or under-crushed. Furthermore, the recesses of the flange in communication with the protrusions of the wall mitigate the rotation of the bung relative to the nut, which aids in the use of the coupler.

The foregoing description has been presented for purposes of illustration and description, and is not intended to be exhaustive list or to limit the exemplary embodiment to precise forms disclosed. It is contemplated that other alternative processes obvious to those skilled in the art are considered to be included in the invention.

What is claimed is:

1. A pneumatic coupler for use with a wall of an agricultural implement, comprising:
   a hollow tube terminating with a flange, said flange comprising a plurality of cutouts and recesses disposed about a periphery of said flange, wherein said cutouts are configured to align with a plurality of protrusions disposed about a periphery of said aperture when said flange is passed through an aperture in the wall of the implement; and wherein said recesses of said flange are formed on a mating surface of said flange for mating with the protrusions on at least a portion of a first side of the wall;
   a nut at least partially surrounding the hollow tube and being connected to the hollow tube on a second side of the wall opposite the first side of the wall; and
   a sealing member positioned between the nut and the second side of the wall to provide a seal at the aperture of the wall.

2. The pneumatic coupler of claim 1 wherein the nut comprises a flange for contacting the sealing member.

3. The pneumatic coupler of claim 2 wherein the nut further comprises a rib extending from the flange to aid in controlling the amount of compression on the sealing member.

4. The pneumatic coupler of claim 1 wherein the hollow tube and nut are threadably connected.

5. The pneumatic coupler of claim 1 wherein the sealing member comprises a compliant material.

6. The pneumatic coupler of claim 5 wherein the sealing member comprises a sponge.

7. The pneumatic coupler of claim 5 wherein the sealing member comprises an elastomeric material.

8. The pneumatic coupler of claim 7 wherein the sealing member comprises EPDM.

9. The pneumatic coupler of claim 1 wherein the sealing member is adhered to the nut.

* * * * *